United States Patent
Sumioki

[19]

[11] Patent Number: 6,029,503
[45] Date of Patent: Feb. 29, 2000

[54] LEAKAGE INSPECTION DEVICE FOR A PLURALITY OF GAS VESSELS

[75] Inventor: Kanji Sumioki, Minamata, Japan

[73] Assignee: Air Liquide Japan, Ltd., Tokyo, Japan

[21] Appl. No.: 09/077,839

[22] PCT Filed: Oct. 13, 1997

[86] PCT No.: PCT/IB97/01264

§ 371 Date: Jun. 11, 1998

§ 102(e) Date: Jun. 11, 1998

[87] PCT Pub. No.: WO98/16808

PCT Pub. Date: Apr. 23, 1998

[30] Foreign Application Priority Data

Oct. 11, 1996 [JP] Japan ..................................... 8-269466

[51] Int. Cl.[7] ............................ B63B 25/00; G01M 3/00; B65B 21/00
[52] U.S. Cl. ................................ 73/40; 73/49.3; 73/49.8; 210/93
[58] Field of Search ............................. 73/40, 49.2, 49.8, 73/40.5 R, 49.3; 210/40.5 R, 92, 93, 104, 248, 253

[56] References Cited

U.S. PATENT DOCUMENTS

| | | | |
|---|---|---|---|
| 4,158,960 | 6/1979 | White et al. .............................. | 73/40.7 |
| 4,440,319 | 4/1984 | Nitchman et al. ...................... | 222/131 |
| 4,446,804 | 5/1984 | Kristiansen et al. ................... | 114/74 R |
| 4,636,475 | 1/1987 | Price et al. ............................... | 436/3 |
| 4,715,721 | 12/1987 | Walker et al. .......................... | 366/132 |
| 4,802,515 | 2/1989 | Pytryga et al. .......................... | 141/97 |
| 5,071,547 | 12/1991 | Cazer et al. .......................... | 210/198.2 |
| 5,095,736 | 3/1992 | Fesler et al. ............................. | 73/23.2 |
| 5,378,355 | 1/1995 | Winkler ................................. | 210/136 |
| 5,381,511 | 1/1995 | Bahar et al. ............................ | 392/472 |
| 5,803,005 | 9/1998 | Stenning et al. ........................ | 114/72 |

*Primary Examiner*—Hezron Williams
*Assistant Examiner*—J. David Wiggins
*Attorney, Agent, or Firm*—Oblon, Spivak, McClelland, Maier & Neustadt, P.C.

[57] ABSTRACT

Providing an apparatus for detecting gas leakage from the periphery of a cylinder valve or the like of a plurality of gas cylinders, non-manually in a short time without failure, in place of manual detection.

The apparatus for detecting gas leakage from a plurality of gas cylinders is characterized in that the apparatus is constructed such that one end of each of flexible hoses (2) is connected to each cap (1) put on a plurality of gas cylinders, the other end of each of flexible hoses is connected to one of the faces of an assembly panel (3), another flexible hose (4) is led out of the other face of the assembly panel and connected to a detector (6), a gas aspirator (5) for sucking gas from the cap, is connected upstream or downstream of the detector (6), and these apparatuses are controlled by a controller (7).

9 Claims, 2 Drawing Sheets

LEAKAGE INSPECTION DEVICE FOR A PLURALITY OF GAS VESSELS

TECHNICAL FIELD OF THE INVENTION

The present invention relates to an apparatus for detecting leakage from the periphery of a cylinder valve of each of cylinders filled with a gas such as hydrogen, helium or a mixed gas thereof, and more specifically, to an apparatus for detecting leakage from thirty cylinders (for instance) at one time prior to their delivery.

PRIOR ART

In a conventional case of detecting leakage from the periphery of a cylinder valve of each of a plurality of cylinders filled with a gas such as hydrogen, detection is carried out by bringing a detection pipe, which is led out of a leakage detector, closer to the periphery of the valve of each cylinder, actuating a gas aspirator to suck gas around the valve, and checking a reaction in the leakage detector.

However, in the conventional leakage detection, it is difficult to detect a trace amount of gas leakage from the periphery of a cylinder valve of a hydrogen or helium containing cylinder, because the gas is mixed with air. Particularly, it is impossible to detect leakage from a cylinder placed outside, for example, on windy day. Furthermore, a long time and much patience are required for checking all the thirty cylinders one by one.

OBJECTS OF THE INVENTION

As mentioned above, it is an object of the present invention to provide an apparatus formed for detecting leakage from the periphery of a cylinder valve of each of a plurality of gas cylinders, non-manually in a short time without failure, in place of a conventional detection performed manually.

MEANS FOR ACHIEVING THE OBJECTS

In order to achieve the aforementioned object, the present invention is characterized by using a leakage-detection apparatus for detecting leakage from a plurality of gas cylinders, which is constructed such that one end of each of flexible hoses is connected to a cap put on the top of each of a plurality of gas cylinders; the other end is connected to one of the faces of an assembly panel; and another flexible hose is led out of the other face of the assembly panel and connected to a detector, and a gas aspirator for sucking gas from each cap is connected upstream or downstream of the detector.

Furthermore, the present invention is characterized by having a controller for actuating the gas aspirator, assembling the flexible hoses derived from the plurality of gas cylinders in the assembly panel, and operating the assembly panel to introduce a sucked gas into the detector separately depending upon gas cylinders.

MODE FOR CARRYING OUT THE INVENTION

FIG. 1 shows an apparatus of the present invention for detecting leakage from the periphery of a cylinder valve of each of a plurality of gas cylinders. This apparatus comprises:

- a plurality of caps (1) to be put on the individual gas cylinders filled with gas;
- a plurality of flexible hoses (2), each having one end connected to the top of each of the plurality of caps (1), and the other end connected to one (3a) of the faces of a flexible hose assembly panel (3);
- another flexible hose (4) led out of the other face (3b) of the flexible hose assembly panel (3) and connected to a detector (6);
- a gas aspirator (5) inserted into the flexible hose (4); and
- a controller (7) for controlling the flexible hose assembly panel (3), the gas aspirator (5), and the detector (6), individually.

The flexible hose assembly panel (3) has an introduction port in one (3a) of the faces. To the introduction port, about 30 to 50 flexible hoses can be connected. From the other face (3b) of the flexible hose assembly panel (3), the flexible hose (4) is led out. The plurality of flexible hoses (2) can be connected to the flexible hose (4) sequentially one by one, by controlling the flexible hose assembly panel (3) by the controller (7).

As shown in FIG. 1 and FIG. 2, the cap (1) is put on the cylinder valve attached to the top of each of the plurality cylinders (C). The cap (1) is formed of a thin plastic material in the form of, for instance, an upper-half bottle. If gas leakage occurs from the top of one of the plurality of cylinders under detection, the leakage gas can be sucked together with air, which is introduced from a slit between an lower portion of the cap (1) and the cylinder, by sucking through the flexible hose (2). As a result, no special force is applied to the cap. Whereas, even if no leakage occurs, air is sucked, so that no special force is applied. Accordingly, the cap can be formed of a simple material such as a thin plastic material so as to cover the top surface of the gas cylinder.

The detector (6) shown in FIG. 1 functions as follows: If gas leakage occurs from the top of one of the plurality of cylinders (C) under detection, the leakage gas is introduced into the detector (6) together with air as described above. The gas is detected at a detecting part of the detector (6) and the detection data is stored in a memory part of the detector (6). In the same manner, data for a no-leakage cylinder is also stored in the memory part of the detector (6).

Hereinbelow, we will explain how to detect the leakage from the plurality of cylinders by using the leakage detection apparatus of the present invention.

Thirty cylinders are filled with hydrogen gas until the pressure reaches 200 atm. The cylinder valve (B) attached to each cylinder is closed (note that, in the case of a bundle of cylinder where hydrogen gas is taken out from thirty cylinders filled with hydrogen gas only by operating a main valve, the main valve is closed while each cylinder valve is left open). Then, the thirty cylinders filled with hydrogen gas are assembled in one place. The cap (1) is put on the top of each cylinder (C). Thereafter, individual flexible hoses (2) are connected one by one to the flexible hose (4) with the flexible hose assembling panel (3) interposed therebetween. When the gas aspirator (5) is actuated, the hydrogen gas accumulated in each cap (1) is independently sucked and introduced into the detector (6). The presence or absence of hydrogen-gas leakage is checked and memorized. The flexible hose assembly panel (3), the gas aspirator (5), and the detector (6) are automatically operated on the basis of the operation modes which have been set and stored in the controller (7).

ADVANTAGE OF THE INVENTION

If the leakage detection apparatus of the present invention is used for detecting gas leakage from the periphery of a cylinder valve of a plurality of gas cylinders, it is possible to detect gas leakage non-manually after the cap is put on a plurality of gas cylinders. If this apparatus is used, anybody even if he is not a person skilled in the art, can detect gas leakage without difficulty. Furthermore, it is possible to detect gas leakage from cylinders arranged either vertically or horizontally.

EXPLANATION OF REFERENCE SYMBOLS

Figure 1:
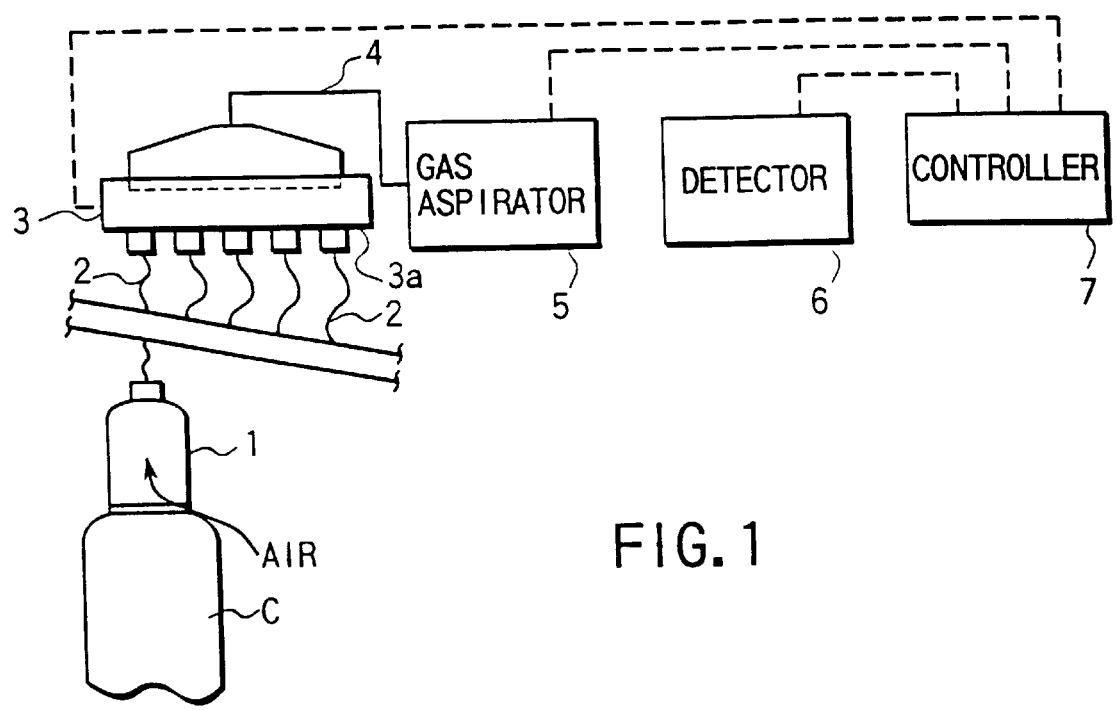
FIG. 1 shows an example of an apparatus of the present invention for detecting leakage from a plurality of gas cylinders.
Figure 2:
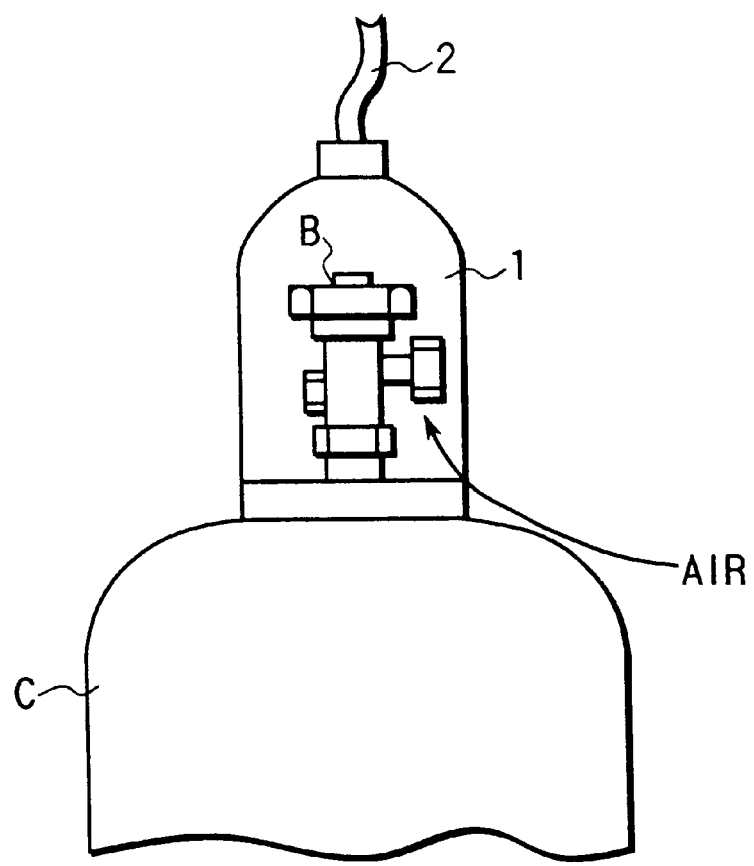
FIG. 2 shows an example of a capped gas cylinder and cylinder valve of the present invention.

1. Cap
2, 4. Flexible hoses
3. Flexible hose assembly panel
5. Gas aspirator
6. Detector
7. Controller
C. Cylinder
B. Cylinder valve

I claim:

1. A gas leak detection system for detecting gas leakage from a plurality of cylinders having corresponding gas delivery valves and containing a positively pressurized gas, comprising:

an assembly panel including multiple inlet ports and an outlet port connected to said multiple inlet ports;

a plurality of caps adapted to be mounted on respective of the cylinders over the corresponding gas delivery valves in a non-airtight manner, said plurality of caps being connected to corresponding of the multiple inlet ports of the assembly panel by a plurality of hoses extending therebetween; and a gas detector connected to the assembly panel via said outlet port and configured to detect gas leaking from the any of plurality of cylinders.

2. The system of claim 1, wherein each gas cap forms a cavity around the corresponding gas delivery valve, the system further comprising:

an aspirator configured to draw gas from the cavities to the gas detector.

3. The system of claim 2, further comprising:

a controller configured to automatically control the operation of the assembly panel, the gas detector, and the aspirator.

4. The system of claim 1, wherein the assembly panel comprises:

switching means for selectively establishing gas flow communication between one of the inlet ports and the outlet port.

5. The system of claim 4, further comprising:

a controller configured to automatically control the operation of the switching means and the gas detector.

6. The system of claim 5, wherein the controller further comprises:

means for causing the switching means to sequentially establish gas flow communication between each of the inlet ports and the outlet port such that only one inlet port is in gas flow communication with the outlet port at a time.

7. The system of claim 1, further comprising:

a controller configured to automatically control the operation of the assembly panel and the gas detector.

8. The system of claim 1, wherein each cap has a slit configured to cause the cap to be mounted in a non-airtight manner on the corresponding gas cylinder.

9. The system of claim 1, wherein the caps are formed of a plastic material.

* * * * *